Dec. 6, 1932.

L. A. MORIN

FUEL BURNING APPARATUS

Re. 18,684

Original Filed Jan. 31, 1930

INVENTOR.
Louis A. Morin.
BY Walter C. Ross.
his ATTORNEY.

Reissued Dec. 6, 1932

Re. 18,684

UNITED STATES PATENT OFFICE

LOUIS A. MORIN, OF WESTFIELD, MASSACHUSETTS

FUEL BURNING APPARATUS

Original No. 1,843,954, dated February 9, 1932. Serial No. 424,823, filed January 31, 1930. Application for reissue filed October 12, 1932. Serial No. 637,517.

This invention relates to improvements in fuel burning apparatus and is directed to apparatus for burning fuel oil and the like.

The novel features of the invention are concerned with apparatus which is especially adapted for use in connection with stoves and ranges whereby fuel oil may be used in place of coal.

The principal objects of the invention are directed to the novel combination and arrangement of parts hereafter more fully described in connection with the accompanying drawing, in which.

Figure 1:
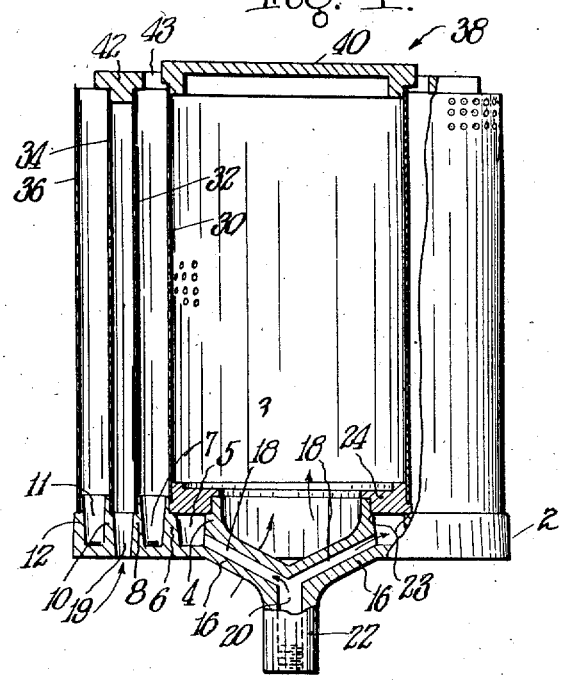
Fig. 1 is a side elevational view, partly in section, of an apparatus embodying the novel features of the invention.
Figure 3:
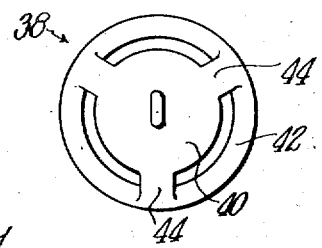
Fig. 3 is a small scale plan view of the cover for the burner.

Referring to the drawing in detail the invention will now be described.

A base 2 is provided which has a plurality of upwardly extending and concentrically arranged, annular, spaced, rims or walls 4, 6, 8, 10 and 12.

A central support or connecting member 22 in the form of a Y has the outer ends of its upper arms 16 integral with the inner rim 4, leaving air supply passages through the base within the inner rim. Annular depressions or channels 5, 7 and 11 are formed by the upwardly extending rims as shown. Passageways 18 in arms 16 are in communication with a central passageway 20 of the lower arm 22 of the support so that fuel may be delivered upwardly through the support and into the bottom of the depression 5.

Figure 2:
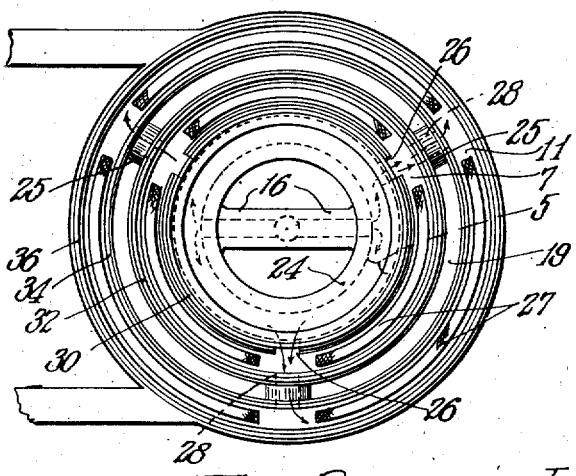
Fig. 2 is a plan view of the apparatus shown in Fig. 1 with the cover removed.

A cover 24 having a central opening as shown rests upon suitable shoulders 23 in adjacent faces of the rims 4 and 6 so as to overlie the depression 5, forming a closed compartment adapted to serve as a vaporizing chamber. The lower side of the base is cut away between the rims 8 and 10 to provide an annular air space or passageway 19 upwardly through the base and the rims 8 and 10 are connected at intervals by radial lugs 25, see Fig. 2.

The base member accordingly comprises an inner, radially broad, annular, base portion provided with inner, outer and intermediate walls 4, 8 and 6, respectively, forming the channels 5 and 7 and a surrounding, relatively narrow, annular, base portion spaced therefrom but connected by the lugs 25 provided with the walls 10 and 12, forming the channel 11.

The rim 6 is cut away at intervals, as indicated by 26, to form ducts connecting the vaporizing compartment 5 with the channel 7, and openings 28 forming other ducts extend through the lugs 25 connecting the channels 7 and 11 so that fuel may find its way into channel 11 from channel 5. Wicks 27 of some material capable of absorbing oil are disposed in the channels 7 and 11 as shown.

It will be observed that the position of the ducts with relation to the height of the walls forming the wick-receiving channels is such that liquid fuel admitted to the vaporizing compartment may pass to the surrounding wick-receiving channels and maintain a body of liquid fuel therein during the starting of the burner at a level well below the tops of said walls.

A plurality of cylindrical or tubular members comprising combustion tubes 30, 32, 34 and 36 are provided and are arranged in spaced, concentric relation. Their lower ends rest upon suitable shoulders at the sides of the rims and their lower sides face about the rims all as shown. In this way they are supported and held against relative shifting movements. These cylinders are perforated as is indicated in Fig. 1 and may be made of any relatively thin metal.

There is thus provided an inner combustion chamber between the tubes 30 and 32 above and opening into the channel 7 and an outer combustion chamber between the tubes 34 and 36 above and opening into the channel 11, as well as an intermediate air chamber between the tubes 32 and 34 supplied with air through the passages 19 in the base and an inner air chamber within the inner tube 30 supplied with air through the central air passages in the base.

A cover 38 is provided which has a central plate 40 and an annular ring 42 spaced therefrom by arms 44 so as to form an annular space 43 therebetween. The cover rests upon the upper ends of the tubes so that the central tube is closed while the space 43 is disposed above the depression 7.

In operation the apparatus is placed in the fire box of a range or stove and the support is connected by a suitable pipe to a supply of fuel oil. A suitable control valve is of course inserted in the pipe which when opened will allow fuel to flow upwardly into the channel 5 from whence it will flow through cutouts 26 and passageways 28 into channels 7 and 11 and saturate the wicks 27.

The wicks are ignited from a flame inserted downwardly into the apparatus. As the base, cylinders and other parts of the apparatus become heated by the flames from the wicks the fuel is vaporized as is desirable for combustion.

It will be noted that air may enter the apparatus upwardly through the annular slot 19 and through the central opening around the support 14 which is of course desirable for combustion. The cylinders or tubes are easily removable to facilitate access to the wicks, etc. The apparatus is simple in construction so as to be economical to manufacture, while at the same time it is efficient in its operation.

The vaporizing chamber formed in the channel 7 beneath the cover plate 24 and underlying the inner air chamber provides a highly efficient vaporizing chamber, particularly advantageous during the starting operation of the burner. During starting the vaporizing chamber has transmitted to the liquid fuel therein the heating effect of the quickly and intensely heated walls of the inner combustion tube 30, not only through the intervening cover plate by way of both radiation and conduction, but also directly by conduction from the said tube through the intermediate wall 6, the latter forming one side of the vaporizing chamber and in turn also receiving further heat from the immediately adjacent wick.

While I have shown a single burner, it will be obvious that a plurality of burners may be grouped together if desired.

Various changes may be made in the form of the invention without departing from the spirit and scope thereof. Therefore I wish to claim and secure by Letters Patent of the United States the following:

1. A burner apparatus comprising in combination, a base having a central opening therethrough, a plurality of concentrically arranged annular rims including an innermost rim extending upwardly from said base to form separate annular channels therebetween, a cover having a central opening over the innermost rim and the rim next adjacent thereto, perforated cylinders extending upwardly from said next adjacent rim and those surrounding the same, a connecting member in said central opening of the base having a fuel supply passageway in communication with the innermost channel, the said rims between the channels being provided with passageways whereby the channels are in communication, and the said base being provided with a slot therethrough between the rims forming adjacent channels and a cover at the upper side of said cylinders closing the innermost cylinder and the space between the cylinders at opposite sides of the said slot in the base and provided with an opening therethrough between the innermost cylinder and the cylinder next adjacent thereto.

2. A burner apparatus comprising in combination, a base having a central opening therethrough, an innermost rim and other spaced, concentrically arranged rims extending upwardly from said base to provide channels therebetween, means providing passageways establishing communication between said channels, a connecting member axially of said burner having arms connected to said base and provided with fuel supply passageways in said arms in communication with the channel adjacent to said innermost rim, a cover over said innermost rim and the next adjacent rim, perforated cylinders extending upwardly from said other rims including an innermost cylinder and a cover at the upper side of said cylinder having a part for closing said innermost cylinder and a part for closing a space between certain of said cylinders, the upper surface of said first-named part being disposed in a plane above that of said last-named part.

3. A liquid fuel burner having spaced, concentric, combustion tubes forming inner and outer combustion chambers with an intermediate air chamber and an inner air chamber enclosed within the inner tube, a base surmounted by said combustion tubes and comprising an inner, radially broad, annular base portion and an outer, relatively narrow, annular base portion separated from and surrounding said inner base portion and having connections thereto at intervals, said base having openings between said connections for supplying air to said intermediate air chamber and an opening within said inner base portion for supplying air to said inner air chamber, said outer base portion having a pair of concentrically arranged, upwardly extending, spaced, annular walls forming between them an annular, wick-receiving channel beneath and opening into the outer combustion chamber, and said inner, broad base portion having concentrically arranged, upwardly extending, spaced, annular walls, the same comprising an inner, an outer and an intermediate wall forming an outer wick-receiving channel beneath and opening into said inner combustion chamber and an inner channel surrounded by said last-named outer wick-receiving channel, a separate cover plate engaging the innermost wall of said broad base portion extending beneath said inner air chamber, completely covering the innermost channel thereof to provide a confined vaporizing chamber in close proximity to said adjacent wick-receiving channel and separated therefrom by said intermediate wall only, said intermediate wall being provided with at least one duct connecting the vaporizing chamber with the adjoining wick-receiving channel and said base being further provided with at least one other duct connecting the last-named channel and the outer surrounding channel, and a fuel supply pipe out of the path of the products of combustion and connected to supply liquid fuel to said vaporizing chamber.

4. A liquid fuel burner having spaced, concentric, combustion tubes forming inner and outer combustion chambers with an intermediate air chamber and an inner air chamber enclosed within the inner tube, a base surmounted by said combustion tubes and comprising concentrically arranged, spaced, annular base portions with connections between the same at intervals, one being radially broad and the other relatively narrow, said base having openings between said connections for supplying air to said intermediate air chamber and an opening within the inner base portion for supplying air to said inner air chamber, said narrow base portion having a pair of concentrically arranged, upwardly extending, spaced, annular walls forming between them an annular wick-receiving channel beneath and opening into one of said combustion chambers, and said broad base portion having concentrically arranged, upwardly extending, spaced, annular walls comprising an inner, an outer and an intermediate wall, forming between said intermediate wall and one of said other walls a wick-receiving channel beneath and opening into said other combustion chamber and between said intermediate wall and the remaining one of said walls a vaporizing channel separated from said wick-receiving channel only by said intermediate wall, a separate cover plate resting on the broad, annular portion of said base extending beneath one of said air chambers and completely covering said vaporizing channel to provide a confined vaporizing chamber in close proximity to said adjacent wick-receiving channel, said base being provided with ducts interconnecting said channels and comprising at least one duct in the intermediate wall of said broad base portion connecting the vaporizing chamber with the adjacent wick-receiving channel and at least one other duct leading to said other wick-receiving channel through the connections between said spaced annular base portions, and a fuel supply pipe out of the path of the products of combustion and connected to supply liquid fuel to said vaporizing chamber.

5. A liquid fuel burner having spaced, concentric, combustion tubes forming inner and outer combustion chambers with an intermediate air chamber and an inner air chamber enclosed within the inner tube, a base surmounted by said combustion tubes and comprising concentrically arranged, spaced, annular base portions with connections between the same at intervals, one being radially broad and the other relatively narrow, said base having openings between said connections for supplying air to said intermediate air chamber and an opening within the inner base portion for supplying air to said inner air chamber, said narrow base portion having a pair of concentrically arranged, upwardly extending, spaced, annular walls forming between them an annular wick-receiving channel beneath and opening into one of said combustion chambers, and said broad base portion having concentrically arranged, upwardly extending, spaced, annular walls comprising an inner, an outer and an intermediate wall, forming between said intermediate wall and one of said other walls a wick-receiving channel beneath and opening into said other combustion chamber and between said intermediate wall and the remaining one of said walls a vaporizing channel separated from said wick-receiving channel only by said intermediate wall, a separate cover plate resting on the broad, annular portion of said base and completely covering said vaporizing channel to provide a confined vaporizing chamber in close proximity to said adjacent wick-receiving channel, said base being provided with ducts interconnecting said channels and comprising at least one duct in the intermediate wall of said broad base portion connecting the vaporizing chamber with the adjacent wick-receiving channel and at least one other duct leading to said other wick-receiving channel through the connections between said annular base portions, the bottoms of said ducts being so located with relation to the walls of said channels as to permit liquid fuel admitted to said vaporizing chamber to pass to said wick-receiving channels and be there maintained at a level below the tops of the walls thereof, and a fuel supply pipe out of the path of the products of combustion and connected to supply liquid fuel to said vaporizing chamber.

In testimony whereof I have affixed my signature to this specification.

LOUIS A. MORIN.

4

CERTIFICATE OF CORRECTION.

Reissue No. 18,684. December 6, 1932.

LOUIS A. MORIN.

It is hereby certified that the above numbered patent was erroneously issued to the inventor said "Morin" whereas said patent should have been issued to "The Silent Glow Oil Burner Corporation, of Hartford, Conn., a corporation of Connecticut", as assignee of the entire interest in said invention as shown by the records of assignments in this office; and that the said Letters Patent should be read with this correction therein that the same may conform to the record of the case in the Patent Office.

Signed and sealed this 17th day of January A. D. 1933.

(Seal)

M. J. Moore,
Acting Commissioner of Patents.